(12) United States Patent
Voglewede et al.

(10) Patent No.: US 9,141,862 B2
(45) Date of Patent: Sep. 22, 2015

(54) UNATTENDED SURVEILLANCE DEVICE AND ASSOCIATED METHODS

(75) Inventors: Paul Voglewede, N. Chili, NY (US); Jeffrey Zampieron, Rochester, NY (US); Geoffrey Amey, Webster, NY (US)

(73) Assignee: HARRIS CORPORATION, Melbourne, FL (US)

( * ) Notice: Subject to any disclaimer, the term of this patent is extended or adjusted under 35 U.S.C. 154(b) by 1668 days.

(21) Appl. No.: 12/239,003

(22) Filed: Sep. 26, 2008

(65) Prior Publication Data
US 2010/0079594 A1 Apr. 1, 2010

(51) Int. Cl.
*G06K 9/00* (2006.01)
*H04N 7/18* (2006.01)
*H04N 7/20* (2006.01)

(52) U.S. Cl.
CPC ............ *G06K 9/00771* (2013.01); *H04N 7/183* (2013.01); *H04N 7/20* (2013.01)

(58) Field of Classification Search
USPC ......................................................... 348/155
See application file for complete search history.

(56) References Cited

U.S. PATENT DOCUMENTS

| | | | |
|---|---|---|---|
| 5,625,715 A | 4/1997 | Trew et al. ..................... 382/236 |
| 5,778,100 A | 7/1998 | Chen et al. ..................... 382/243 |
| 5,974,192 A | 10/1999 | Kundu ............................ 382/260 |
| 6,043,853 A | 3/2000 | Shimazaki et al. ............ 348/625 |
| 6,400,831 B2 | 6/2002 | Lee et al. ....................... 382/103 |
| 6,456,328 B1 | 9/2002 | Okada ............................ 348/390 |
| 6,531,965 B1 | 3/2003 | Nelson et al. ............. 340/870.01 |
| 6,646,676 B1 | 11/2003 | DaGraca et al. ............... 348/155 |
| 6,678,413 B1* | 1/2004 | Liang et al. .................... 382/181 |
| 6,757,328 B1 | 6/2004 | Huang et al. ................ 375/240.1 |
| 6,954,142 B2 | 10/2005 | Lieberman et al. ........... 340/509 |
| 7,005,981 B1 | 2/2006 | Wade ........................ 340/539.17 |
| 7,026,600 B2 | 4/2006 | Jamieson et al. .............. 250/221 |
| 7,403,664 B2 | 7/2008 | Porikli et al. .................. 382/235 |
| 2001/0005222 A1* | 6/2001 | Yamaguchi .................... 348/223 |
| 2002/0028021 A1 | 3/2002 | Foote et al. .................... 382/224 |
| 2002/0126755 A1* | 9/2002 | Li et al. ...................... 375/240.12 |

(Continued)

OTHER PUBLICATIONS

"Profiling Sensor for ISR Applications", Ronald B. Sartain, Army Research Laboratory, AMSRD-ARL-SE-SE, 2800 Powder Mill Road, Adelphi, MD 20783, Unattended Ground, Sea and Air Sensor Technologies and ApplicationsX, Proc. of SPIE vol. 6963, 69630Q, (2008), 0277-786X/08/$18, doi: 10.1117/12.796194, pp. 69630Q-1-69630Q-11.

(Continued)

*Primary Examiner* — Angela Nguyen
(74) *Attorney, Agent, or Firm* — Allen, Dyer, Doppelt, Milbrath & Gilchrist, P.A.

(57) ABSTRACT

The unattended surveillance device may include a housing to be positioned for unattended surveillance, a video camera associated with or carried by the housing to capture video, and an image processor carried by the housing and cooperating with the video camera. The image processor extracts moving objects in the foreground of the captured video, generates a profile image or sequence of profile images of the extracted moving objects, compresses the sequence of profile images, and generates a surveillance information packet based upon the compressed sequence of profile images. Also, a wireless transmitter or transceiver may be associated with the image processor to transmit the surveillance information packet to a surveillance monitoring station.

20 Claims, 3 Drawing Sheets

(56) References Cited

U.S. PATENT DOCUMENTS

| | | |
|---|---|---|
| 2004/0131254 A1* | 7/2004 | Liang et al. .................. 382/181 |
| 2004/0141635 A1* | 7/2004 | Liang et al. .................. 382/110 |
| 2004/0143602 A1 | 7/2004 | Ruiz et al. .................. 707/104.1 |
| 2004/0212677 A1* | 10/2004 | Uebbing ........................ 348/155 |
| 2004/0233844 A1* | 11/2004 | Yu et al. ........................ 370/230 |
| 2006/0044389 A1* | 3/2006 | Chai et al. .................... 348/143 |
| 2006/0104346 A1* | 5/2006 | Li et al. ..................... 375/240.01 |
| 2006/0115170 A1* | 6/2006 | Brakus, Jr. .................... 382/245 |
| 2006/0215012 A1* | 9/2006 | De Ruyter ................. 348/14.08 |
| 2007/0035627 A1* | 2/2007 | Cleary et al. ................. 348/159 |
| 2007/0291334 A1* | 12/2007 | Nakanishi ..................... 358/509 |
| 2008/0111680 A1 | 5/2008 | Presicci .................. 340/539.22 |
| 2008/0111884 A1 | 5/2008 | Cloutier et al. |
| 2008/0212099 A1* | 9/2008 | Chen .............................. 356/408 |
| 2009/0141939 A1* | 6/2009 | Chambers et al. ............. 382/103 |
| 2009/0219411 A1* | 9/2009 | Marman et al. .......... 348/231.99 |
| 2009/0290794 A1* | 11/2009 | Marchesotti ................... 382/173 |
| 2010/0008539 A1* | 1/2010 | Johnson ........................ 382/103 |
| 2010/0040285 A1* | 2/2010 | Csurka et al. ................. 382/170 |
| 2010/0141762 A1* | 6/2010 | Siann et al. .................... 348/143 |

OTHER PUBLICATIONS

Viola et al., Robust Real-Time Face Detection, International Journal of Computer Vision, 57(2), pp. 137-154, 2004 Kluwer Academic Publishers, the Netherlands.

* cited by examiner

| FORMAT | RAW RATE | ESTIMATED COMPRESSION |
|---|---|---|
| GRAY SCALE IMAGE (720x576) | 405K BYTES | 16,000 BYTES (JPEG2000) |
| PROFILE IMAGE (720x576) | 25K BYTES (ONE FIELD) | 400 BYTES (JBIG2) |
| | | |
| GRAY SCALE VIDEO (720x576, 5 FPS) | 16 M BITS/SEC | 500K BITS/SEC (MPEG4) |
| PROFILE VIDEO (720x576, 5 FPS) | 1 M BITS/SEC | 16K BITS/SEC (JBIG2) |

FIG. 4

UNATTENDED SURVEILLANCE DEVICE AND ASSOCIATED METHODS

FIELD OF THE INVENTION

The present invention relates to the field of surveillance, and, more particularly, to remote and unattended surveillance devices, systems and related methods.

BACKGROUND OF THE INVENTION

Remote, unattended intrusion detection and surveillance capabilities are suited to the security of installations (commercial, government, and/or military) and perimeters, as well as for the protection of borders and other assets (e.g. associated with homeland defense). For example, Harris Corporation of Melbourne, Fla., and Assignee of the present application, produces an advanced sensor system product line that offers such features: the Harris Falcon Watch Remote Intrusion Detection and Surveillance system.

The Falcon Watch system includes the RF-5405 Intelligent Gateway, a communications node that receives alarms from multiple sensors and fuses the data into actionable reports for relay to command centers; and the RF-5400 Falcon II Sensor Node, which is integrated with Harris Falcon II tactical radios to provide situational awareness for the mobile user. The Falcon Watch system utilizes seismic detectors, which detect ground vibration caused by vehicles or pedestrians; magnetic detectors, which detect the movement of metal objects such as weapons or vehicles; and passive infrared (PIR) sensors, which detect the movement of thermal signatures such as vehicles or pedestrians. Inputs are processed at the point of detection and then the resulting alarms are transmitted by radio to a monitoring point.

Multiple radio relay nodes can be used to extend the system to protect larger-scale perimeters. The Falcon Watch system is modular and configurable to address a broad range of threat or topographical environments. The system is specifically designed to withstand the rigors of harsh environments while operating in remote locations for very extended periods without battery replacement. The Falcon Watch system detects the movement of vehicles and people while filtering out non-threatening, naturally occurring events. It transmits alarms to the Harris Falcon II RF-5800V-HH Advanced VHF Tactical Handheld Radio or the Falcon II RF-5800M-HH Advanced Multiband Tactical Handheld Radio.

This allows the user to receive real-time sensor alerts directly without carrying additional monitoring hardware. The sensor alarms can also be displayed by the Harris RF-6910 Situational Awareness System to provide a complete operational picture at a command center. The Falcon Watch Sensor system is available in various configurations. The Force Protection configuration is ideal for tactical, on-the-move missions, and for temporary set-ups and deployments. It is small, lightweight, easy to use, and features extended operational life as a result of its advanced low-power techniques. Tactical radio integration results in less equipment that the operator is required to carry and provides immediate notification of area intrusions. The Perimeter Surveillance configuration of the Falcon Watch Sensor system is designed for applications requiring more complex detection and surveillance, such as fixed installations and power-generation facilities.

U.S. Patent Application Publication No. 2008/0111884 to Cloutier et al. (and assigned to Harris Corporation) is directed to an unattended sensor for use in a surveillance system. The sensor includes a detector, a signal processor, a radio transceiver, a power source, and a controller which configures the sensor in either a sensor mode or a relay mode. The monitoring device may be a handheld radio device equipped with a transceiver for sending and receiving data and able to receive event messages from sensor nodes residing in the network. In addition, the radio device may include a signal processor adapted to receive the event messages and provide indicia of the event to the radio operator, e.g. an audible indicator or visual indicator on a display.

There is a need for such surveillance systems to have the capability to reliably classify objects under surveillance into various categories, such as vehicles, humans and animals. Current approaches include the use of a still image camera to take a picture of a subject with analysis to select a trophy image. Also, video cameras may be used. These approaches use a considerable amount of data.

The Army Research Lab provides a profile sensor that includes a linear array of optical trip lines for scanning a profile as a subject passes by the sensor as discussed in "Profiling sensor for ISR applications", Ronald B. Sartain, Proc. Of SPIE, Vol. 6963, Apr. 16, 2008. The Intelligence Surveillance Reconnaissance (ISR) sensor does reduce the amount of data being processed and transmitted, but has poor resolution, requires a constant velocity of the subject passing by, and does not provide information regarding direction or action of the moving objects.

There is a further need for an unattended or remote surveillance capability that includes a reliable classification of objects while also reducing the amount of data needed to be transmitted. Furthermore, such needed classifications may also include the type of animal (e.g. cow, sheep horse etc.), type of vehicle (e.g. motorcycle, truck, car etc.), the quantity, the cargo (e.g. backpack, trailer etc.), the direction (e.g. left to right, or right to left), and/or the action (e.g. walking, running, digging etc.).

SUMMARY OF THE INVENTION

In view of the foregoing background, it is therefore an object of the present invention to provide an unattended or remote surveillance device and method that reduces the amount of data needed to be transmitted and/or includes a reliable classification of objects.

This and other objects, features, and advantages in accordance with the present invention are provided by an unattended surveillance device comprising a housing to be positioned for unattended surveillance, a video camera which may be carried by the housing to capture video data, and an image processor carried by the housing and cooperating with the video camera. The image processor extracts moving objects in a foreground of the video data, generates a sequence of profile images of the extracted moving objects, compresses the sequence of profile images, and generates a surveillance information packet based upon the compressed sequence of profile images. Also, a wireless transceiver may be associated with the image processor to transmit the surveillance information packet to a surveillance monitoring station. The image processor may also receive alarms, commands, and configuration messages via the wireless transceiver.

The image processor may generate the sequence of profile images as a sequence of bi-tonal profile images, and may compress the sequence of bi-tonal profile images according to a Joint Bi-level Image experts Group (JBIG) format. The video camera may be a visible (EO) spectrum video camera, infrared (IR) spectrum video camera, or other imaging device. Furthermore, the image processor may also generate object classification information based upon the sequence of profile images, and include the object classification information in the surveillance information packet.

Such object classification information may include information regarding the moving objects in the sequence of profile images being a vehicle, a person and/or an animal. The object classification information may further include information regarding a type of vehicle, a type of animal, a quantity of moving objects, a cargo carried by the moving objects, a direction of movement and/or an action.

An antenna is preferably coupled to the wireless transceiver. Also, a battery may be carried by the housing to power the video camera, image processor and wireless transceiver. A detector may be carried by the housing to selectively activate the video camera.

A method aspect is directed to surveillance and includes positioning a surveillance device for unattended surveillance. The device includes a housing that may carry a video camera, an associated image processor and an associated wireless transceiver. The method further includes operating the surveillance device to capture video data, to extract moving objects in the foreground of the surveillance video data, to generate a sequence of profile images of the extracted moving objects, to compress the sequence of profile images, to generate a surveillance information packet based upon the compressed sequence of profile images and to transmit the surveillance information packet to a surveillance monitoring station.

Thus, an unattended or remote surveillance device and method are provided that reduce the amount of data needed to be transmitted and/or include a reliable classification of objects. The approach includes the transmission of a surveillance information packet based upon a compressed sequence of profile images from video surveillance data. Such information packet may include the sequence of profile images and/or a classification of moving objects therein.

BRIEF DESCRIPTION OF THE DRAWINGS

FIG. 4 is a table illustrating exemplary characteristics of the data reduction achieved by the unattended surveillance device of FIG. 1.

DETAILED DESCRIPTION OF THE PREFERRED EMBODIMENTS

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

Figure 1:
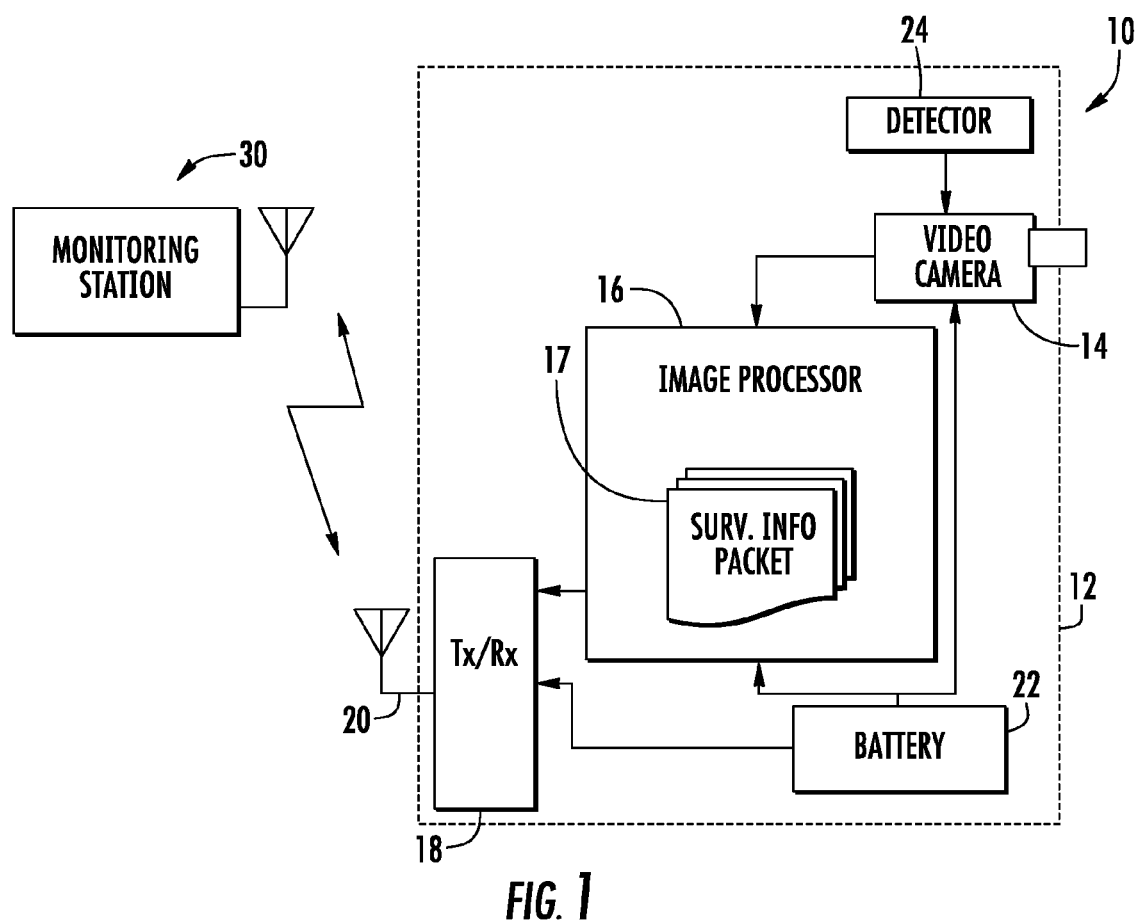
FIG. 1 is a schematic diagram illustrating an unattended surveillance device and associated monitoring station in accordance with an embodiment of the present invention.
Figure 2:
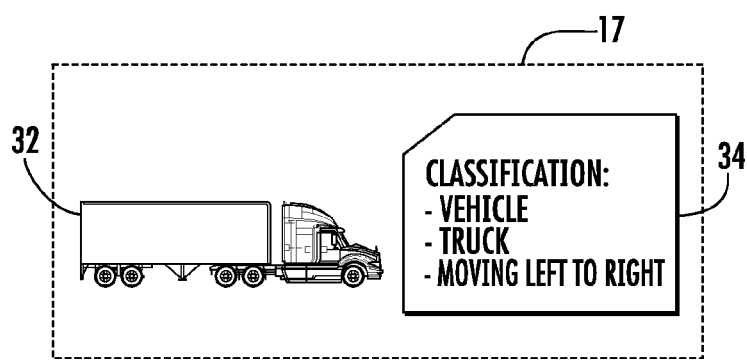
FIG. 2 is a diagram of an exemplary surveillance information packet which may be generated and transmitted by the unattended surveillance device of FIG. 1.
Figure 3:
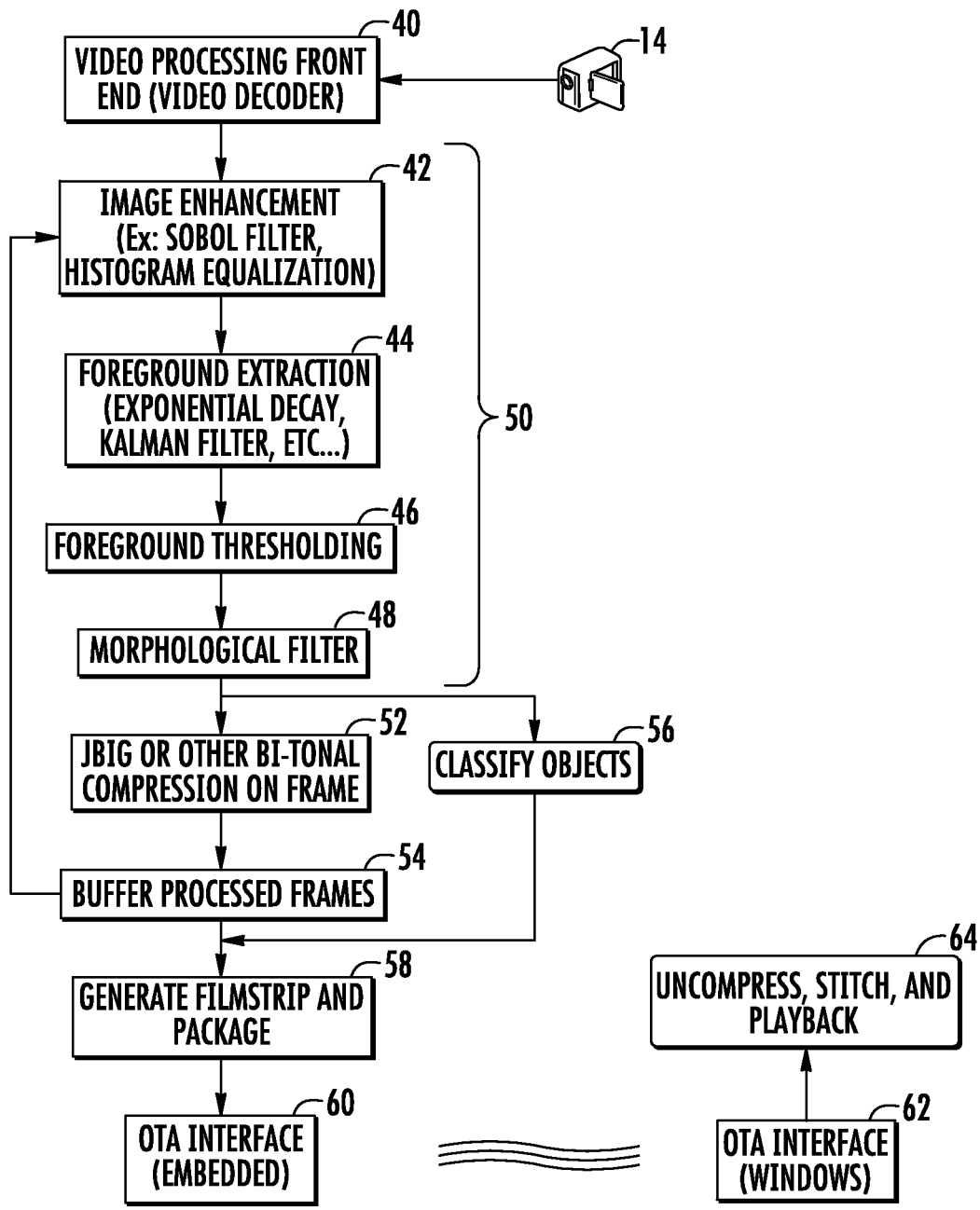
FIG. 3 is a flowchart illustrating an example of the operational features of the unattended surveillance device of FIG. 1.

Referring initially to FIGS. 1-3, an unattended or remote surveillance device 10 in accordance with an embodiment will be described. The surveillance device 10 may provide remote, unattended intrusion detection and surveillance capabilities suited to the security of installations (commercial, government, and/or military) and perimeters, as well as for the protection of borders and other assets (e.g. associated with homeland defense). The surveillance device 10 reduces the amount of data needed to be transmitted to a monitoring station 30 and/or includes reliable classification of objects under surveillance as further discussed below.

The unattended surveillance device 10 includes a housing 12 to be positioned for unattended surveillance. A video camera 14, e.g. a visible or infrared (IR) spectrum video camera, may be carried by the housing 12, or connected externally thereto, to capture surveillance video, e.g. visible or infrared (IR) spectrum video. An image processor 16 is carried by the housing 12 and cooperates with the video camera 14 to decode the video at block 40 (FIG. 3). It will be appreciated that, in other embodiments, the video may be received by the image processor 16 via an external video source. Also, embodiments of the image processor may combine software and hardware aspects as would also be appreciated by those skilled in the art.

Referring more specifically to blocks 50 in FIG. 3, the image processor 16 extracts moving objects in a foreground of the surveillance video data (e.g. 15 s of video with 5 fps) using image enhancement at block 42 (e.g. Sobel filtering, histogram equalization), foreground extraction at block 44 (e.g. exponential decay, Kalman filtering, etc.) and foreground thresholding at block 46 as would be appreciated by those skilled in the art. The image processor 16 generates a sequence of profile or silhouette images 32 (e.g. a sequence of bi-tonal profile images that can be solid like a shadow or in outline form) of the extracted moving objects using, for example, a morphological filter at block 48.

At block 52 the image processor 16 compresses the sequence of profile images using a Joint Bi-level Image experts Group (JBIG) format or other bi-tonal compression technique before buffering (block 54) as would be appreciated by those skilled in the art. A surveillance information packet 17 is generated at block 58 based upon the compressed sequence of profile images. Furthermore, the image processor 16 may also generate (block 56) object classification information 34 based upon the sequence of profile images 32, and include the object classification information 34 in the surveillance information packet 17, as illustrated in FIG. 2.

Such object classification information 34 may include information regarding the moving objects in the sequence of profile images being a vehicle, a person and/or an animal. Furthermore, such classifications may also include, for example, information regarding the type of animal (e.g. cow, sheep horse etc.), the type of vehicle (e.g. motorcycle, truck, car etc.), the quantity of the objects, the cargo (e.g. backpack, trailer etc.), the direction (e.g. left to right, or right to left), and/or the action (e.g. walking, running, digging etc.). Of course, other classification information may also be provided as desired by the operator and available through profile image classification techniques.

Classification can be performed on the bi-tonal profile image. Examples include individual template matching and feature-based classification as described in "Robust Real-Time Face Detection" International Journal of Computer Vision Volume 57, Issue 2 (May 2004), Pages: 137-154. The results of the classification of each frame are combined to produce an overall classification based on the entire observation window.

A wireless transceiver 18 is associated with the image processor 16 to transmit the surveillance information packet 17 to a surveillance monitoring station 30 using an over-the-air (OTA) interface (block 60), e.g. an antenna 20 is preferably coupled to the wireless transmitter 18. The monitoring station 30 receives the surveillance information packet 17 (at block 62) and performs the appropriate data processing at block 64, e.g. uncompressing and playback of the sequence of profile images.

A battery 22 may be carried by the housing 12 to power the video camera 14, image processor 16 and wireless transceiver 18. A detector 24 or trip sensor, e.g. motion, passive infrared (PIR), seismic, etc., may be carried by the housing 12 to selectively activate the video camera 14. Otherwise, the video camera 14 may be remotely and/or periodically operated or always on, as desired by the operator.

A method aspect is directed to surveillance and includes positioning the surveillance device 10 for unattended surveillance. The method includes operating the surveillance device 10 to capture surveillance video, to extract moving objects in the foreground of the surveillance video, to generate a sequence of profile images of the extracted moving objects, to compress the sequence of profile images, to generate a surveillance information packet 17 based upon the compressed sequence of profile images and to transmit the surveillance information packet to a surveillance monitoring station 30.

Thus, an unattended or remote surveillance device 10 and method are provided that reduce the amount of data needed to be transmitted, e.g. as illustrated in the table of FIG. 4 presenting examples of typical captured image frames versus the profile images at an estimated compression in accordance with features of the present embodiments. The approach includes the transmission of a surveillance information packet 17 based upon a compressed sequence of profile images from video surveillance images. Such information packet may include the sequence of profile images 32 and/or a classification 34 of moving objects therein.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

That which is claimed is:

1. A surveillance device comprising:
a housing;
a video camera associated with the housing to capture surveillance video;
an image processor carried by the housing and cooperating with the video camera
to remove moving objects in a foreground of the surveillance video from a background,
to generate at least one silhouette image using the moving objects removed from the background,
to compress the at least one silhouette image, and
to generate a surveillance information packet based upon the compressed silhouette image; and
a wireless transmitter associated with the image processor to transmit the surveillance information packet to a surveillance monitoring station.

2. The surveillance device of claim 1 wherein the image processor is configured to generate the at least one silhouette image as a sequence of bi-tonal silhouette images.

3. The surveillance device of claim 1 wherein the video camera comprises at least one of a visible and infrared (IR) spectrum video camera.

4. The surveillance device of claim 1 wherein the image processor is also configured to generate object classification information based upon the at least one silhouette image, and to include the object classification information in the surveillance information packet.

5. The surveillance device of claim 1 further comprising a battery carried by the housing and configured to power the video camera, image processor and wireless transmitter.

6. The surveillance device of claim 1 further comprising a detector carried by the housing and configured to selectively activate the video camera.

7. The surveillance device of claim 2 wherein the image processor is configured to compress the sequence of bi-tonal silhouette images according to a Joint Bi-level Image experts Group (JBIG) format.

8. The surveillance device of claim 4 wherein the object classification information comprises information regarding the moving objects in the at least one silhouette image being at least one of a vehicle, a person and an animal.

9. The surveillance device of claim 8 wherein the object classification information further comprises information regarding at least one of a type of vehicle, a type of animal, a quantity of moving objects, a cargo carried by the moving objects, a direction of movement and an action.

10. A surveillance information device comprising:
an image processor configured to
remove moving objects in a foreground of surveillance video from a background,
generate a sequence of silhouette images using the moving objects removed from the background,
generate object classification information based upon the sequence of silhouette images,
compress the sequence of silhouette images, and
generate a surveillance information packet based upon the compressed sequence of silhouette images and the object classification information; and
a wireless transmitter cooperating with the image processor and configured to transmit the surveillance information packet to a surveillance monitoring station.

11. The surveillance information device of claim 10 wherein the image processor is configured to generate the sequence of silhouette images as a sequence of bi-tonal silhouette images.

12. The surveillance information device of claim 10 wherein the sequence of image frames comprises at least one of visible and infrared (IR) spectrum video image frames.

13. The surveillance information device of claim 10 wherein the object classification information comprises information regarding the moving objects in the sequence of silhouette images being at least one of a vehicle, a person and an animal.

14. A method of surveillance comprising:
positioning a surveillance device for unattended surveillance, the device comprising a housing and associated video camera, an associated image processor and an associated wireless transmitter; and
operating the surveillance device to capture surveillance video, to remove moving objects in a foreground of the surveillance video from a background, to generate at least one silhouette image using the moving objects removed from the background, to compress the silhouette image, to generate a surveillance information packet based upon the compressed silhouette image and to transmit the surveillance information packet to a surveillance monitoring station.

15. The method of claim 14 wherein the image processor generates the at least one silhouette image as a sequence of bi-tonal silhouette images.

16. The method of claim 14 wherein the video camera captures at least one of a visible and infrared (IR) spectrum video sequence of image frames.

17. The method of claim 14 wherein the image processor also generates object classification information based upon the at least one silhouette image, and includes the object classification information in the surveillance information packet.

18. The method of claim 14 wherein operating the surveillance device further comprises selectively activating the video camera via a detector.

19. The method of claim 15 wherein the image processor compresses the sequence of bi-tonal silhouette images according to a Joint Bi-level Image experts Group (JBIG) format.

20. The method of claim 17 wherein the object classification information comprises information regarding the moving objects in the sequence of silhouette images being at least one of a vehicle, a person and an animal.

\* \* \* \* \*